(12) United States Patent
Devlin

(10) Patent No.: US 6,393,925 B1
(45) Date of Patent: May 28, 2002

(54) GROUNDWATER VELOCITY PROBE

(75) Inventor: John Frederick Devlin, Waterloo (CA)

(73) Assignee: University of Waterloo, Waterloo (CA)

( * ) Notice: Subject to any disclaimer, the term of this patent is extended or adjusted under 35 U.S.C. 154(b) by 0 days.

(21) Appl. No.: 09/528,172

(22) Filed: Mar. 17, 2000

(51) Int. Cl.⁷ .............................................. G01F 1/708
(52) U.S. Cl. .................... 73/861.05; 73/866.5
(58) Field of Search ............... 73/861.07, 861.05, 73/861.95, 866.5

(56) References Cited

U.S. PATENT DOCUMENTS

| | | | |
|---|---|---|---|
| 3,645,127 A | * 2/1972 | Mongodin et al. ............ | 73/40.7 |
| 3,718,043 A | * 2/1973 | Fishman et al. ......... | 73/861.05 |
| 3,839,910 A | * 10/1974 | Fitch ....................... | 73/861.05 |
| 4,166,215 A | 8/1979 | Anderson | |
| 4,167,870 A | 9/1979 | Haas | |
| 4,391,137 A | 7/1983 | Kerfoot et al. | |
| 4,570,492 A | 2/1986 | Walsh | |
| 4,969,363 A | 11/1990 | Mochizuki | |
| 5,127,264 A | * 7/1992 | Schmalz ...................... | 73/147 |
| RE34,265 E | * 5/1993 | Foster et al. ............. | 73/861.05 |
| 5,265,477 A | 11/1993 | Inferrera | |
| 5,297,425 A | 3/1994 | Hamby et al. | |
| 5,339,694 A | 8/1994 | Looney et al. | |
| 5,390,541 A | 2/1995 | Feller | |
| 5,789,663 A | * 8/1998 | Boger ...................... | 73/152.18 |
| 5,796,679 A | 8/1998 | Yankielun | |
| 6,131,451 A | * 10/2000 | Izbicki et al. ............ | 73/152.18 |

FOREIGN PATENT DOCUMENTS

| | | |
|---|---|---|
| EP | 0 763 731 A2 | 3/1997 |
| WO | WO 97/35190 | 9/1997 |

* cited by examiner

*Primary Examiner*—Max Noori
(74) *Attorney, Agent, or Firm*—Arne I. Fors

(57) ABSTRACT

A groundwater velocity probe is provided comprising a surface with a first portion and a second portion, an injector for injecting a tracer proximate the first portion, a detector for detecting the tracer proximate the second portion, and a timer for measuring time elapsed between injecting the tracer and detecting the tracer. A method of measuring groundwater velocity in an aquifer is also provided comprising the steps of providing a groundwater velocity probe in an aquifer, the groundwater velocity probe having a surface with a first portion and a second portion, an injector for injecting a tracer having a characteristic property proximate the first portion, a detector for detecting the characteristic property of the tracer proximate the second portion, and a timer for measuring time elapsed between injecting the tracer and detecting the characteristic property of the tracer, injecting the tracer proximate the first portion, starting a timer in a datalogger, detecting the characteristic property of the tracer proximate the second portion, inputting an electrical signal representative of the characteristic property to the datalogger, and measuring time elapsed between injecting the tracer and detecting the characteristic property with the datalogger.

22 Claims, 8 Drawing Sheets

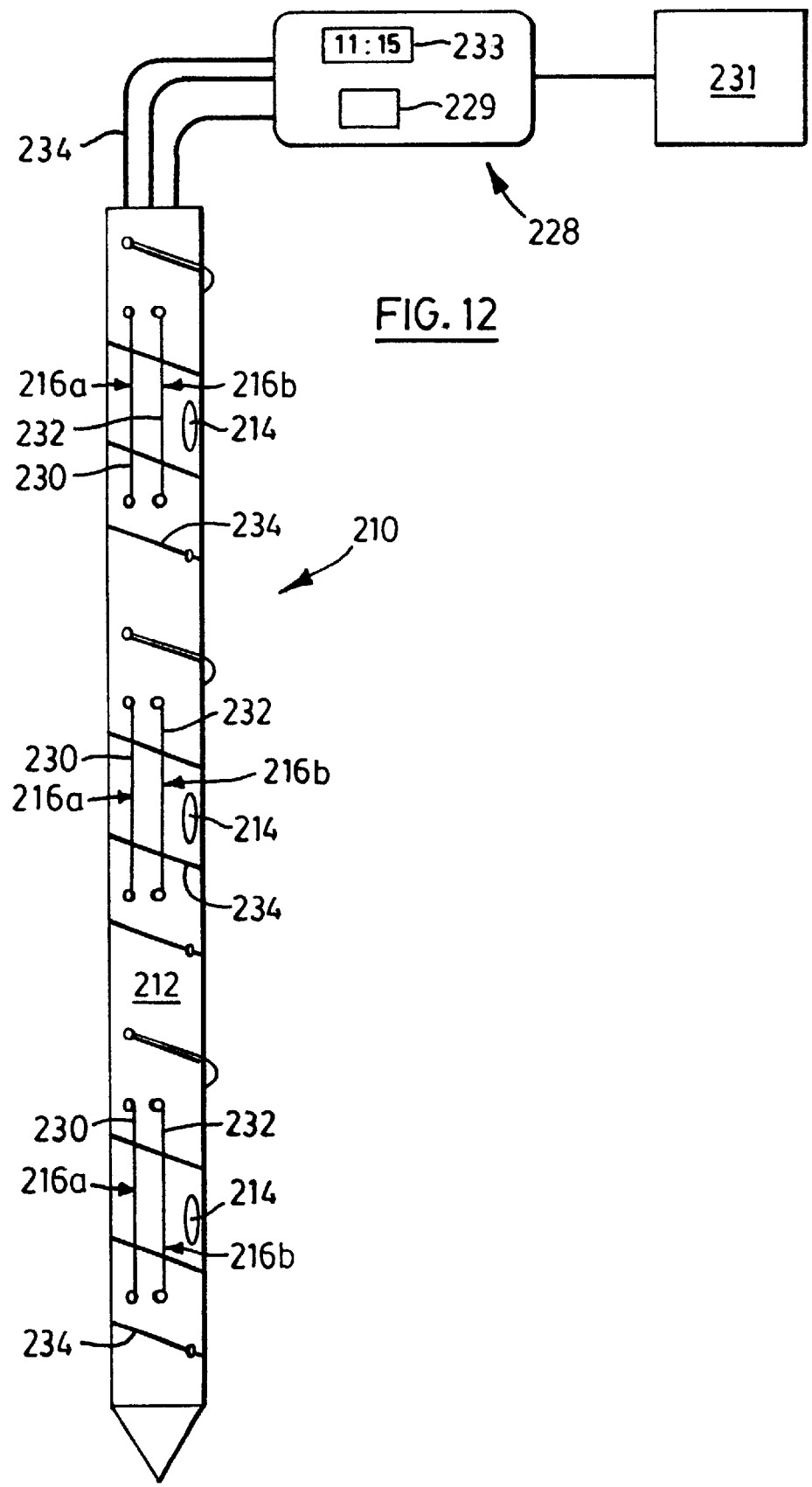

GROUNDWATER VELOCITY PROBE

FIELD OF INVENTION

The present invention relates to groundwater velocity probes, and, more particularly, groundwater velocity probes for measuring speed and direction of groundwater flow in an aquifer.

BACKGROUND OF THE INVENTION

Unsuitable management and contamination of groundwater resources over the past century has damaged a substantial number of aquifer systems, some beyond repair. Contamination resulting from the use, storage, and disposal of hazardous material needs to be tracked and often removed from groundwater systems. This requires an understanding of the mechanism governing the transport of contaminants in the subsurface and will ultimately demand accurate predictions of the fate of contamination. An essential piece of information in assessing a contaminant's fate is the groundwater velocity. Advection, defined as the component of solute movement attributed to transport by the flowing groundwater, is usually the dominant factor in the migration of dissolved contaminants in aquifers. Advection of a contaminant occurs at an equal rate to the average linear groundwater flow velocity (neglecting dispersion, diffusion and assuming a conservative solute). Therefore, accurately measuring the average linear flow velocity is key in predicting the rate of contaminant transport in a groundwater system.

The U.S. Environmental Protection Agency (EPA) has established criteria for determining the groundwater vulnerability at a hazardous waste facility based on the groundwater velocity. These criteria require the calculation of the time of travel of groundwater along a 100-foot flowline originating at the base of the hazardous waste unit. The site is defined as having vulnerable hydrogeology if the groundwater velocity exceeds this distance within a time period of 100 years. It becomes clear that the importance of accurately determining the average linear velocity of the groundwater is essential in determining a site's compliance with government regulatory guidelines.

Similarly, in Canada, the Canadian Ministry of Environment and Energy reserves the authority to permit the use of property for contaminant attenuation or treatment. It must be assured, however, that discharge into neighboring property has no more than a negligible effect on the existing and potential reasonable use of this property. Identifying contaminant discharge into a neighboring area requires the calculation of its rate of transport. The need to identify the average linear groundwater velocity becomes clear.

A substantial number of field methods have been developed to measure average linear velocity. These methods are divided into two broad categories: indirect methods and direct methods.

Indirect methods require measurement of hydraulic conductivity or transmissivity, estimation of the effective porosity and measurement of the hydraulic gradient. Applying Darcy's Law, the average linear velocity can then be calculated as shown below. Indirect methods include bail tests, pumping tests, and mapping of hydraulic heads.

$$v = \frac{(K)}{(\theta)} \frac{(\Delta H)}{(\Delta L)}$$

Where,
K=Hydraulic Conductivity (L/T)
H=Hydraulic Head (L)
L=Linear Distance (L)
O=Porosity (dimensionless)

The indirect calculation of the linear groundwater flow is limited by the difficulty in accurately measuring hydraulic conductivity. Hydraulic conductivity quantifies the permeability of a medium and has an associated error range of an order of magnitude.

Empirical relationships exist between hydraulic conductivity, the characteristics of a porous medium, and the properties of a fluid, by means of theoretical and dimensional analyses. The Hazen Formula is a frequently used empirical formula that calculates the hydraulic conductivity of a porous medium on the basis of grain size distributions. The method is applicable to sands with an effective grain-size ($d_{10}$) between approximately 0.1 and 3.0 mm. The Hazen Formula is outlined below:

Hazen Formula:

$$K = C(d_{10})^2$$

Where,
K=Hydraulic Conductivity (L/T)
C=Hazen Coefficient (dimensionless)
$d_{10}$=Effective Grain Size (L)

The bail test or slug test method involves the imposition of in instantaneous change in hydraulic head at a single well that penetrates a water bearing formation. Either adding (slug test) or removing (bail test) a column of water from the well induces a change in hydraulic head. The rate at which the system returns to its initial equilibrium state is dependent upon the permeability of the formation and the well-bore conditions. By measuring the change in the water level as a function of time, it is possible to compute the hydraulic conductivity of the formation in the immediate vicinity of the well. Generally, several such measurements are made to establish the formation's range of hydraulic conductivity, and then an average value is used to estimate flow velocities.

The principle disadvantage of an indirect method, such as a slug or bail test, is that hydraulic conductivity is only measured to within an order of magnitude. This means that velocities can only be calculated to within an order of magnitude. Slug and bail tees have the additional disadvantage of being conducted through well screens and filter packs, which can make analysis of the data complex.

Pumping tests involve pumping water from a well for a predetermined period of time, at a fixed rate. The drawdown of the water table is measured at the pumping well and selected observation wells in the vicinity. The data are used to calculate large-scale hydraulic conductivity values, which are then applied to velocity estimation. Unfortunately, pumping test require a considerable investment of time and can be expensive to perform.

In the direct measurement of the groundwater flow velocity, an instrument is inserted into the porous medium or a monitoring well, and is used to measure the rate of groundwater movement. This measurement can be directly related to the average linear flow velocity or related using a calibration constant determined indeperndently. Direct methods include thermal gradient instruments such as the K-V Associates Model 30 Geoflo Meter®, and concentration gradient tests such as a borehole dilution test, and natural gradient tracer tests.

A thermal gradient instrument consists of a, submersible probe attached by cable to a controlling device located at the ground surface. The probe contains a central pair of thermistors. After the probe is lowered to the desired depth in the well, the central heat probe emits a short duration heat pulse. The resulting heated water advects in the direction of the groundwater flow at a rate dependant on the average linear groundwater velocity. The thermistors are monitored at the surface to determine the relative thermal differences of the five opposing thermistor pairs. Based on these relative differences the user can estimate relative groundwater velocity. The K-V Associates Model 30 Geoflo Meter® exemplifies this method. The Geoflo Meter® is designed to directly measure the groundwater velocity and flow direction. Since this method is based on relative differences in values of temperature, it must be calibrated against a set of standards. This is accomplished by using a calibration chamber supplied by the manufacturer.

Direct measurement of groundwater velocity and flow direction in this manner is limited by the fact that measurements are made within a well screen. First there may be problems with calibration. If the conditions of the well screen used for calibration are not identical to those in the surrounding aquifer, calibration is likely to be inaccurate. Second, there may be problems with instrument sensitivity because flow velocities in the range of 10 cm/day or less are not easily measurable with precision.

Borehole dilution is a well-established method for analysing groundwater velocity. It is a tracer technique that is performed in a section of a well isolated by inflatable packers from the remainder of the well. A small amount of tracer is quickly injected into the isolated test section and is subjected to continual mixing as groundwater gradually replaces the tracer solution in the well. A log normalized concentration-versus-time curve can be plotted allowing for the magnitude of the horizontal velocity of the groundwater flow to be calculated. Testing vertically distinct sections of the well, a picture of the vertical velocity variation in the aquifer (near the well) can be obtained. The measurement of the lateral variability of the flow system depends on the number and distribution of monitoring wells. This method endeavours to account for the flow system distortions through a well screen. However, this accounting requires a calibration test for each well.

The chief disadvantage of the borehole dilution method is the need for mixing in the well. Downhole mixers have not proven reliable and recirculation of the tracer solution from the well to the surface and back limits the depth at which the measurements can be made. The difficulties associated with calibration for an in-ground well screen are also non-trivial.

The natural gradient tracer test is arguably the most representative method for determining the velocity of a particular solute in a groundwater flow system. The test involves injecting a tracer into a flow system and monitoring its progress with time. Despite its representativeness, this method is a most expensive and costly option. A test can run for years and requires that the test area be well instrumented with groundwater samplers.

SUMMARY OF THE INVENTION

The present invention is directed to groundwater velocity probe for measuring groundwater velocity in an aquifer.

According to one aspect of the present invention, a groundwater velocity probe is provided comprising a groundwater velocity probe comprising a surface with a first portion and a second portion, means for injecting a tracer proximate the first portion, first means for detecting the tracer proximate the second portion, and means for measuring time elapsed between injecting the tracer and detecting the tracer. The surface can be cylindrical. The cylindrical surface can further comprise a third portion, and a second means for detecting the tracer can be provided proximate the third portion, such that the means for injecting the tracer is disposed between the first means for detecting and the second means for detecting and such that the first and second means for detecting are oriented along different flowpaths originating from the means for injecting. The probe can further comprise a pointed end for facilitating hammering of the probe into an aquifer. The first and second means for detecting the tracer can include conductivity sensors. The means for detecting the tracer can be disposed along substantially the same plane at which the tracer is injected. The probe can also include first ad second warning detectors disposed above and below the means for detecting the tracer, such that the first and second warning detectors sense non-linear travel of the sensor. The probe can also include angular indicators for enabling rotation of a cylindrical probe about its axis by a non-angular displacement. The probe can also include computing means for estimating groundwater velocity proximate the second portion.

A further aspect of the invention provides a groundwater velocity probe comprising a cylindrical surface with a first portion, a second portion, and a third portion, means for injecting a tracer proximate the first portion, first means for detecting the tracer proximate second portion, second means for detecting the tracer proximate the third portion, and means for measuring time elapsed between injecting the tracer and detecting the tracer, such that the first and the second means for detecting are oriented along a common flowpath originating for the means for injecting.

In another aspect, the present invention provides a method of measuring groundwater velocity in an aquifer comprising the steps of:

(i) providing a groundwater velocity probe in an aquifer, the groundwater velocity probe having a surface with a first portion and a second portion, means for injecting a tracer having a characteristic property proximate the first portion, means for detecting the characteristic property of the tracer proximate the second portion, and means for measuring time elapsed between injecting the tracer and detecting the characteristic property of the tracer, (ii) injecting the tracer proximate the first portion, (iii) starting a timer and a datalogger, (iv) detecting the characteristic property of the tracer proximate the second portion, (v) inputting an electrical signal representative of the characteristic property to the datalogger, and (vi) measuring time elapsed between injecting the tracer and detecting the characteristic property with the datalogger.

The method can also include the further step of inputting the time elapsed information into a computer for estimating the velocity of the tracer proximate the second portion.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 12 is a schematic drawing of a further embodiment of the groundwater velocity probe.

DETAILED DESCRIPTION

Figure 1:
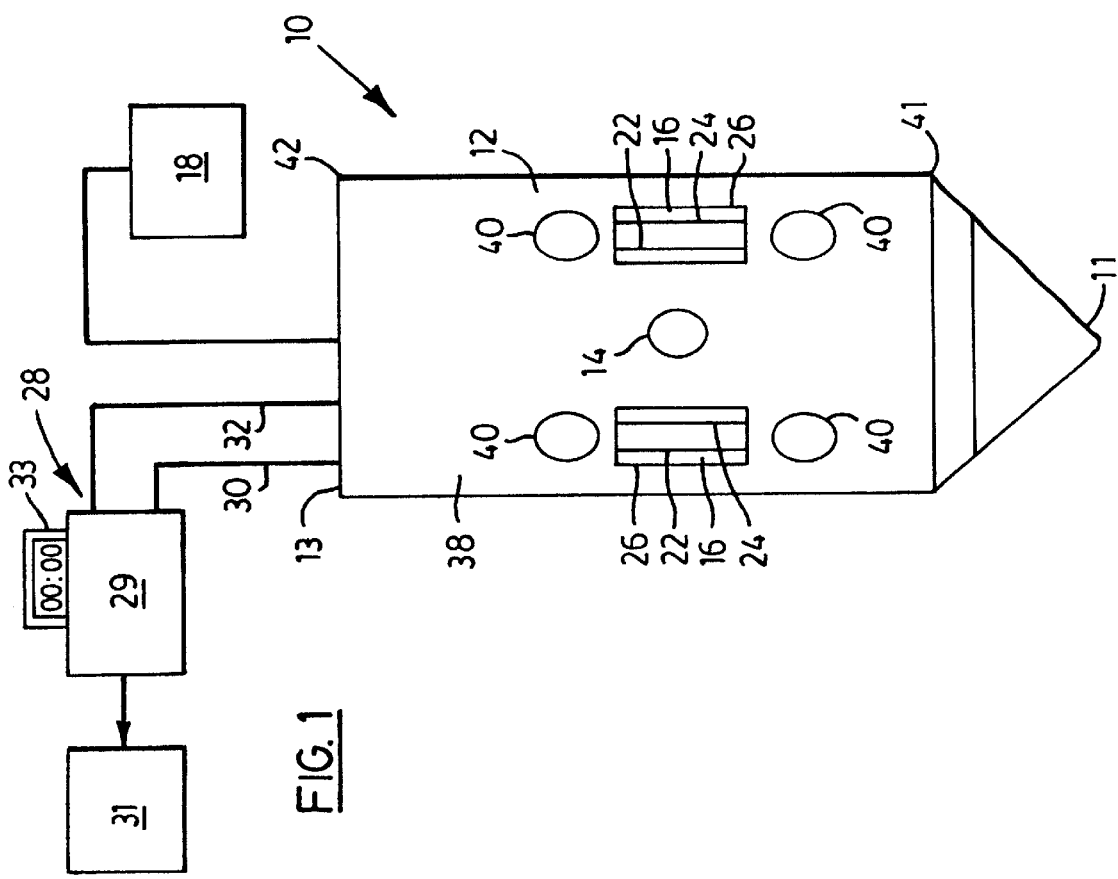
FIG. 1 is a schematic drawing of an embodiment of the groundwater velocity probe.
Figure 8:
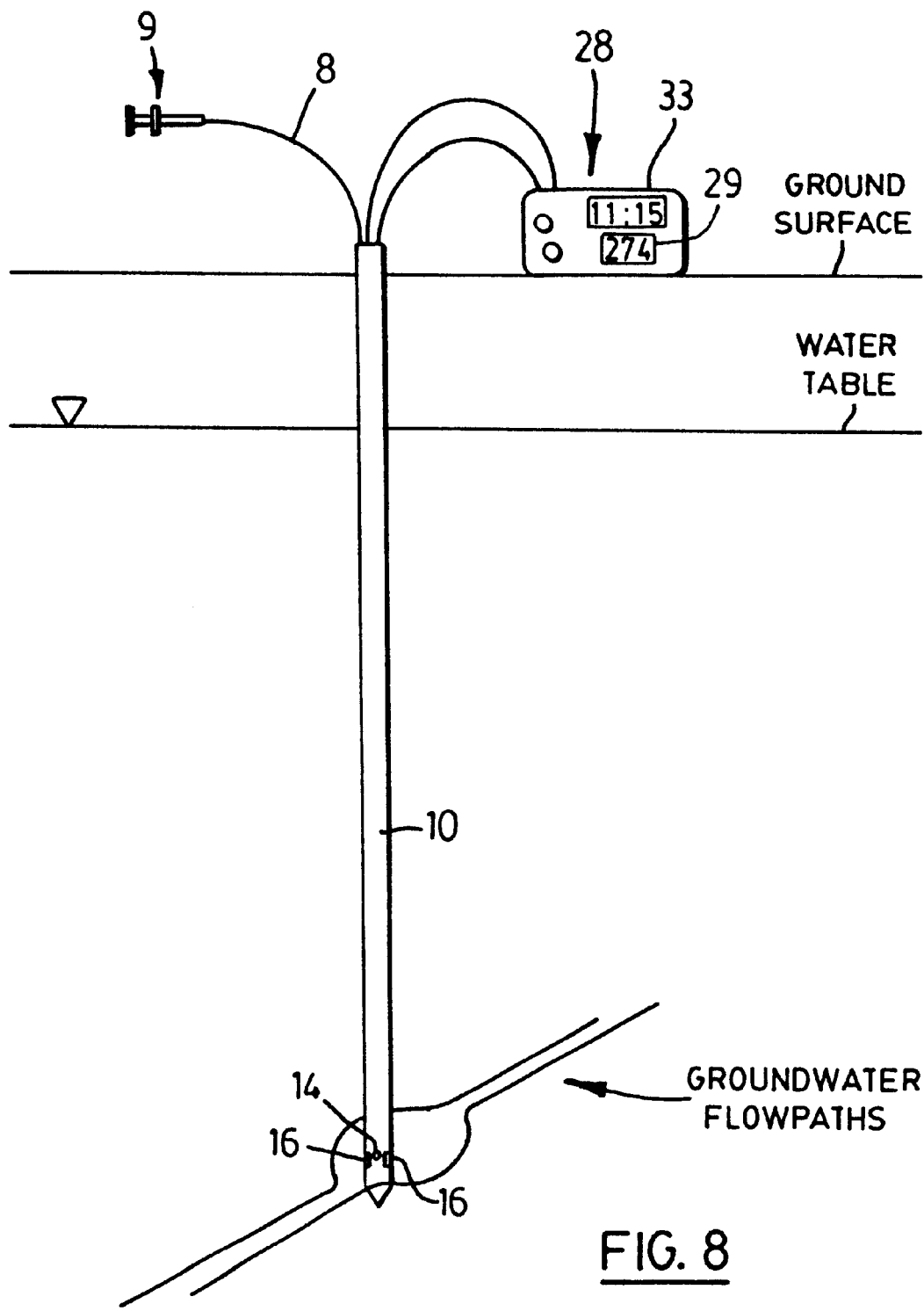
FIG. 8 is a schematic drawing of the groundwater velocity probe inserted into an aquifer for measurement of groundwater velocity.

Referring to FIGS. 1 and 8, a groundwater velocity probe 10 is provided for measuring the velocity of groundwater in an aquifer. The probe 10 includes an outwardly facing surface 12, in intimate contact with the environment of a surrounding aquifer. The surface 12 includes an injector port 14 and a detector 16 which is spaced from injector port 14. Preferably, detector 16 is disposed along substantially the same horizontal plane as injector port 14.

The injector port 14 communicates with a supply of tracer solution 18 for injection of such tracer solution into the aquifer. The tracer can be injected through injector port 14 using a syringe (see FIG. 8). The tracer solution is electrically conducting and must necessarily be characterized by an electrical conductance measurably greater or less than that of the aquifer environment surrounding the probe 16. Once a slug of tracer solution is injected through injector port 14, detector 16 functions to detect any portion of the slug which traverses detector 16 as the slug is carried by groundwater flow from the injector port and across detector 16. By traversing detector 16, slug causes closure of an electrical circuit, thereby facilitating measurement of conductance by a conductivity meter 29 which is part of such electrical circuit. The time interval between injection and detection of the tracer slug is then measured to enable calculation of groundwater velocity in the surrounding aquifer.

Detector 16 can be adapted to detect other measurable characteristics of the tracer solution slug, such as heat, radiation or electrochemistry. In such cases, detector 16 would include corresponding sensors for measurement of such characteristics.

Figure 2:
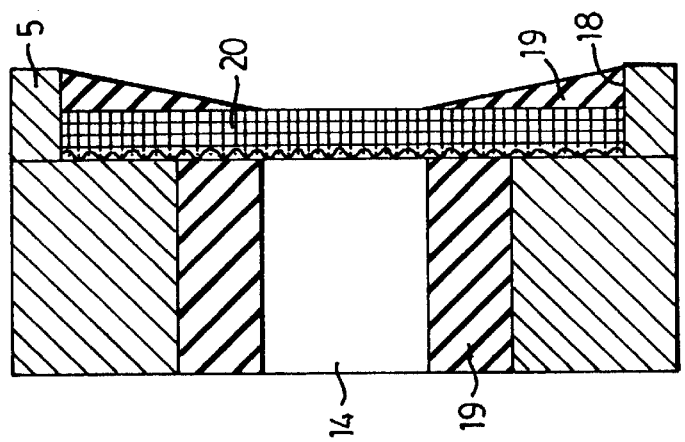
FIG. 2 is an elevation view, partially in section, of the injector port of the groundwater velocity probe inside elevation.

Injector port 14 comprises a throughbore provided within surface 12. Referring to FIG. 2, surface 12 includes a first recessed surface portion 5 immediately next to and surrounding the throughbore, forming a groove 18. A screen 20 is fitted within the groove 18 for preventing ingress of any surrounding solid matter into the injector port 14. The screen 20 is fixed within groove 18 by a waterproof sealing system 19, such as a waterproof epoxy resin. The epoxy resin is also used to fill any gaps between injector port 14 and surface 12. Preferably, the epoxy resin is applied such that transition between the surface 12 and the recessed injector port 14 is gradual, substantially avoiding sharp edges. In this respect, the applied epoxy resin forms part of surface 12 surrounding injector port 14. Sharp edges about the injector port 14 may otherwise affect flow patterns in the vicinity of the injector port 14, thereby rendering it more difficult to provide accurate measurements of groundwater velocity in the aquifer.

Detector or sensor 16 comprises a pair of electrically conducting elements 22 and 24 provided flush with a second recessed surface portion 26 provided in surface 12. By positioning elements 22 flush with second recessed surface portion 26, groundwater flow in the vicinity of second recessed surface portion 26 is minimally disturbed. Each of electrically conducting elements 22 and 24 is connected by wires 30 and 32 to a datalogger 28. Datalogger 28 comprises a conductivity meter 29. An electrical circuit is closed, and electrical conductance is concomitantly measured, when an injected tracer slug traverses and spans across elements 22 and 24. In one embodiment, each of elements 22 and 24 is a gauge 20-type wire lead which is vertically oriented, wherein the wire leads are spaced from each other, and wherein an electrical circuit is closed when an injected tracer slag traverses and spans across elements 22 and 24.

Wires 30 and 32 extend from elements 22 and 24 respectively and through apertures 34 and 36 provided in second recessed surface portion 26. Element 22 and 24 are maintained flush against second recessed surface portion 26 using waterproof epoxy resin. Application of such waterproof epoxy resin further fills any gaps existing between wires 30 and 32 and sidewalls of the associated apertures.

Datalogger 28 is preferably located remote from the aquifer, such as the earth's surface. Further, wires 30 and 32 are preferably isolated from the aquifer environment. In this respect, wires 30 and 32 preferably extend through apertures 34 and 36 and into a conduit 38 having first and second ends 41 and 42. First end 41 is closed, and is disposed within the aquifer environment when it is desired to measure groundwater velocity in the aquifer. Second end 42 is open, and is disposed remote from the aquifer environment when it is desired to measure groundwater velocity in the aquifer. Wires 30 and 32 are routed through conduit 38, emerge from second end 42, and are then connected to datalogger 28. Datalogger 28 includes a conductivity meter 29 which receives an electrical signal from detector 16, such signal being representative of conductivity of the tracer slug traversing the detector 16. The datalogger 28 logs and stores such information as a function of time. In this respect, datalogger 28 includes a timer 33. The datalogger 28 and its timer 33 can be manually actuated when the tracer is injected, or can be automatically triggered by tracer injection. The datalogger 28 is connected to a computer 31 for inputting information with respect to conductivity as a function of time. Computer 31 calculates apparent velocity of detector 16, and the bulk velocity of the groundwater flow in the aquifer including its direction.

Referring to FIG. 8, the wires 30 and 32 from the detector 16 are run through the hollow centre of the probe 10 to the datalogger 28. Next to the wires 30 and 32 is the tracer delivery line 8 running between an injection device, such as a syringe 9, and the injector port 14. In one application of the technique, the datalogger 28 is switched on for several minutes prior to the test beginning to establish background conductivity values. Once this is done, the time is recorded, or the datalogger 28 is reset, and the tracer is injected via injector port 14. The arrival of the tracer at the detector 16 is marked by a dramatic change (usually a rise, but in principle a less conductive solution could be used as well) in conductivity. The datalogger 28 measures the time since injection, monitors the conductivity of the groundwater at the sensor and stores the data in electronic form for downloading to a computer 31, such as a PC, upon completion of the test. The computer then estimates the apparent velocity of the tracer slug passing the detector 16 based on the time elapsed between the injection of the tracer and its detection by detector 16. Monitoring continues as long as the conductivity at the detector 16 remains elevated (or depressed) relative to background.

In one embodiment, and as illustrated in FIG. 2, probe 10 includes a pair of detectors 16, disposed on either side of and spaced from injector port 14 and oriented along directionally opposite flowpaths originating from the injector port 14. By having one detector 16 disposed on either side of injector port 14, tracer detection and, therefore, groundwater velocity measurements can be facilitated irrespective of the general direction of groundwater flow.

Optionally, surface 12 of probe 10 includes warning detectors 40 disposed above and below each detector 16. The warning detectors 40 are oriented from the horizontal plane defined by the injector port 14. In the embodiment illustrated in FIG. 1, the warning detectors 40 are oriented 45° from this horizontal plane. The orientation of the warning detectors 40 provides a system whereby the warning detectors 40 indicate whenever the groundwater flow has a significant vertical component. Where groundwater flow has a significant vertical, component, methods used to estimate groundwater velocity, based on data measured by the probe, may be inapplicable where such methods rely on theoretical relationships governing linear flow. Warning detectors 40, like detectors 16, can be connected by wiring to conductivity meter 26, and conductivity measured by detectors 40 could be logged by conductivity meter 26 as a function of time.

Figure 3:
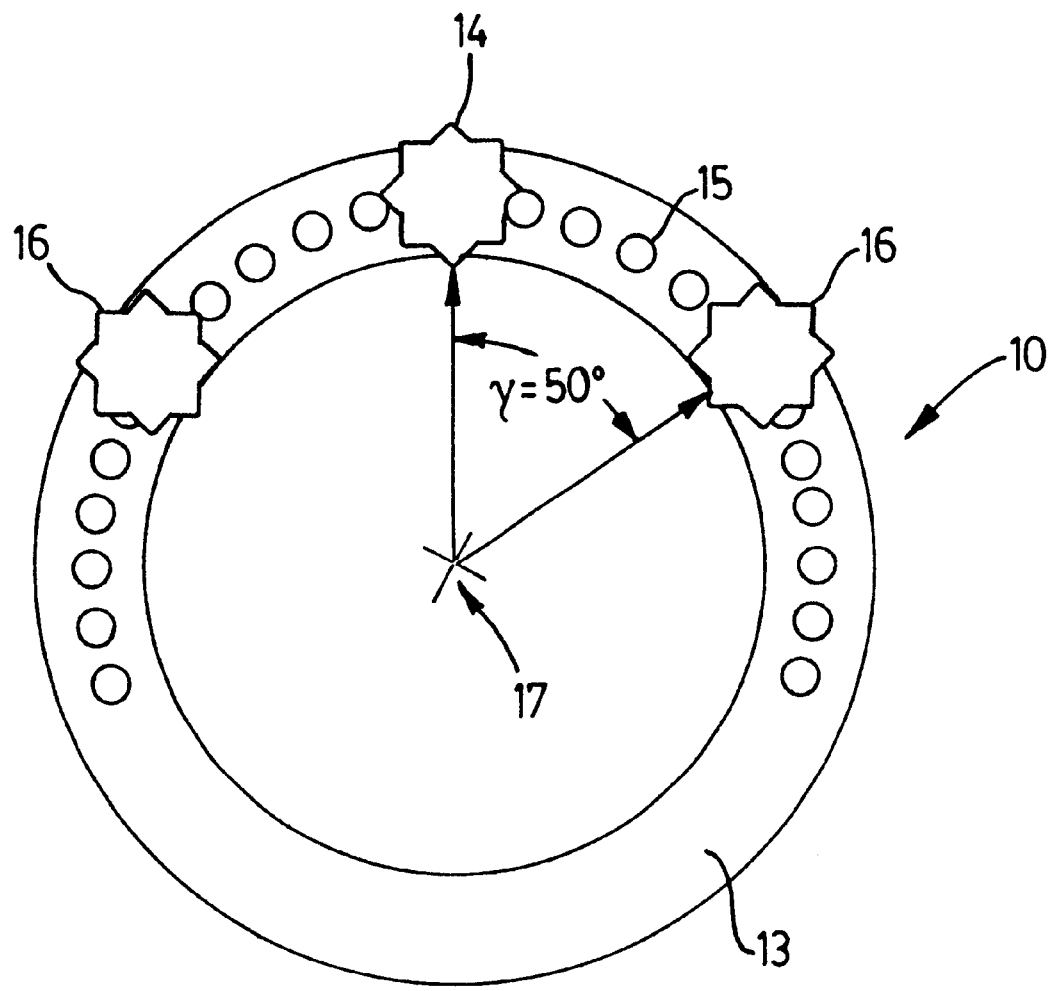
FIG. 3 is a schematic drawing of a plan view of the groundwater velocity probe.
Figure 7:
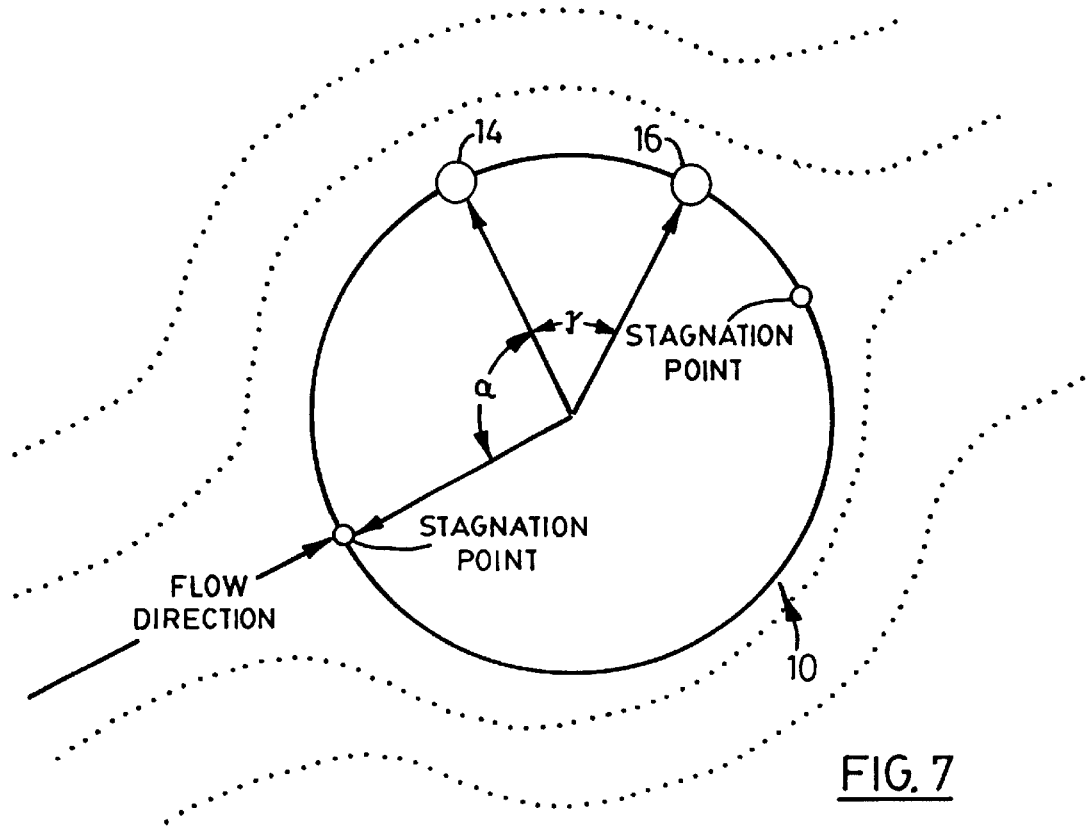
FIG. 7 is a schematic drawing of a plan view of the groundwater velocity probe, illustrating the angles α and γ.

Referring particularly to FIGS. 3 and 7, in a further embodiment, surface 12 of probe 10 is substantially cylindrical in shape. When it is desired to measure groundwater velocity, probe 10 is positioned such that its cylindrical surface 12 is orthogonal to the groundwater flow. In this respect, groundwater velocity measurements using probe 10 can be extrapolated from velocity measurements at the surface of a cylindrical probe, having regard to theoretical understanding of ideal flow about a cylindrical object.

In another embodiment, The probe 10 is pointed at one end to facilitate insertion of the probe 10 into an aquifer by hammering the probe 10 into the aquifer. In the embodiment illustrated in FIG. 3, the probe 10 includes a first end 11 which is conical in shape, the first end 11 being oriented at the bottom of probe 10 when probe 10 is being used to measure groundwater velocity in an aquifer.

Referring to FIG. 3, probe 10 can also include angular indicators 15 at its second end 13, the second and 13 being oriented proximate the top of probe 10 and outside the aquifer when probe 10 is being used to measure groundwater velocity in such aquifer. Angular indicators 15 enable rotation of probe 10 about its axis (denoted by reference numeral 17) by a known angular displacement. This feature facilitates groundwater velocity measurement by probe 10, as will be further described below.

A method of extrapolating velocity measurements at the surface of a cylindrical probe, to predict linear groundwater velocity in a given aquifer, will now be explained having regard to the relationship between these velocities as theoretically understood. The average linear groundwater velocity is related to the velocity of groundwater flow around the surface of a solid cylinder by the following equation (Bird, Stewart and Lightfoot, Transport phenomena (1960: John Wiley & Sons, Madison, Wis.)).

$$v(\theta) = \sqrt{4v_\infty^2 \sin^2\theta}$$  Equation 1 in which:

$v(\theta)$=Apparent velocity immediately adjacent to the cylinder surface as a function of the angle between the groundwater flow direction and the point on probe where the velocity applies.

$v_\infty$=Average linear velocity in the porous medium at a point in the system unperturbed by the presence of the cylinder.

$\theta$=Angle the groundwater flow direction makes with a point on the cylinder surface.

Figure 4:
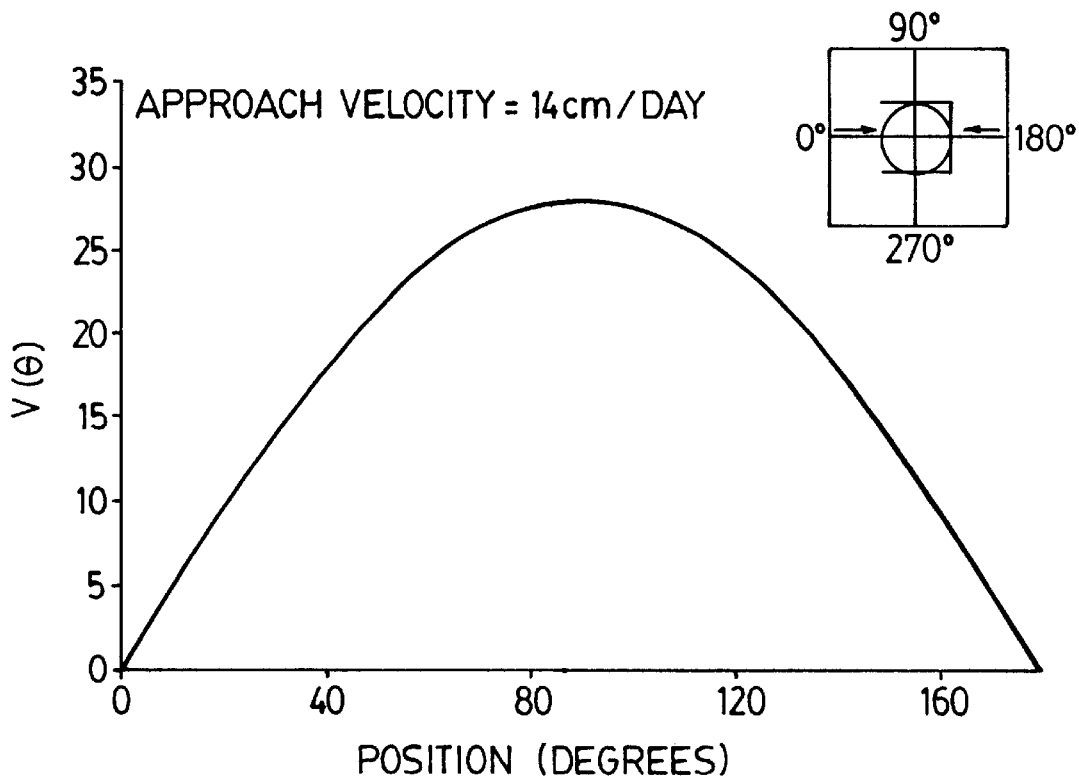
FIG. 4 is a graph illustrating apparent velocity (v(θ)) of groundwater flow as a function of position along the perimeter of the groundwater velocity probe.
Figure 5:
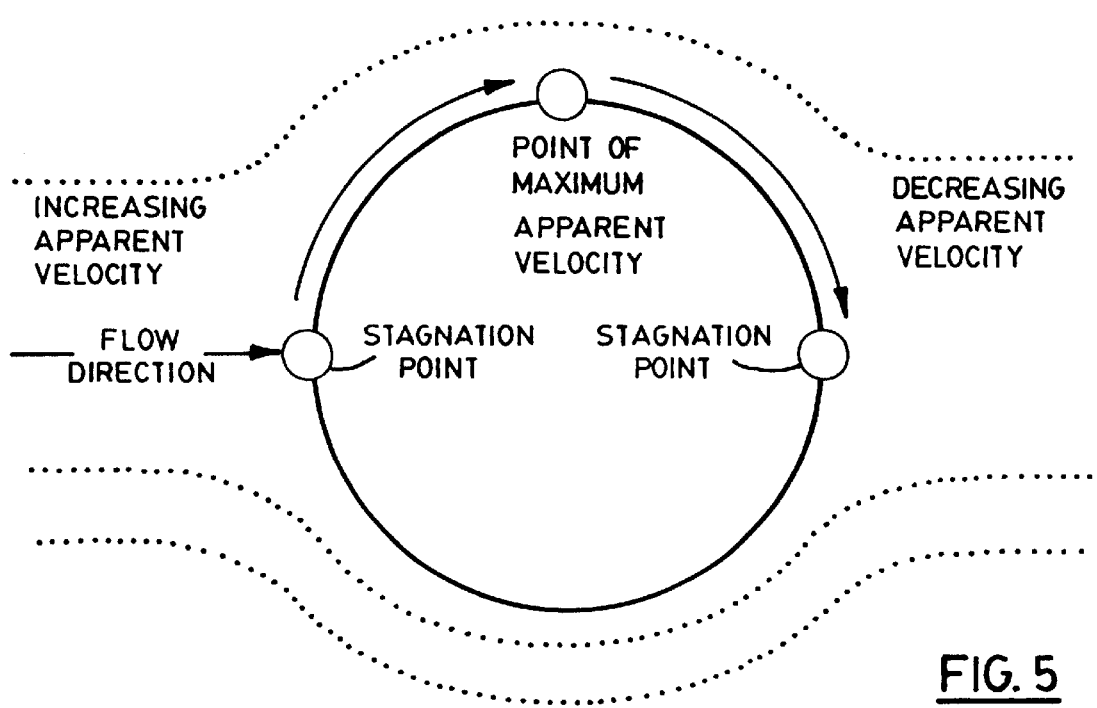
FIG. 5 is a schematic drawing of a conceptual model of the magnitude of the apparent velocity in relation to the station points occurring as groundwater flows around a cylinder.

According to this equation the magnitude of the apparent velocity will vary with position on the probe, as graphically illustrated in FIG. 4. FIG. 4 illustrates no-flow conditions occurring at positions of 0° and 180°, such positions represent both ends of the probe. These area of no flow are referred to as stagnation points. Such points play a significant role in this method of groundwater velocity determination. The effect of the stagnation points on the apparent velocity is illustrated in FIG. 5.

Figure 6:
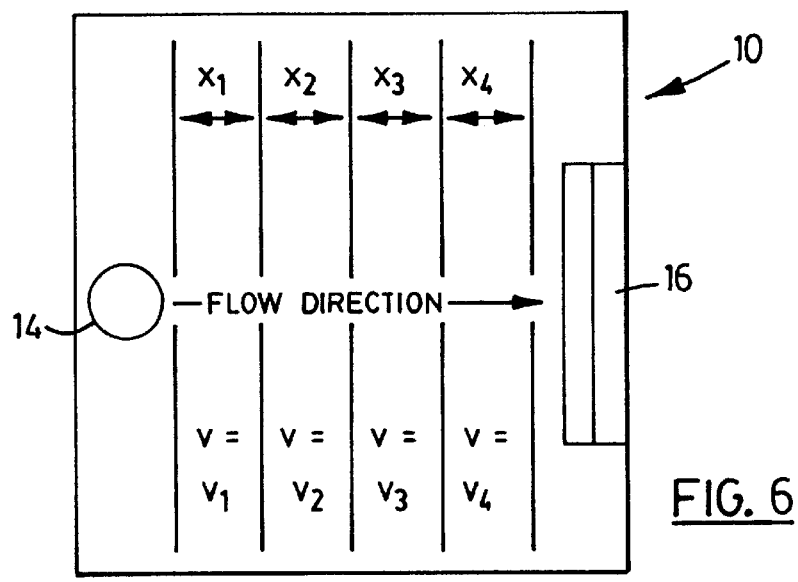
FIG. 6 is a schematic drawing of a sectional front elevation view of the probe's surface.

Since the magnitude of the apparent velocity varies as the groundwater flow travels around the perimeter of a cylindrical probe, the probe's surface can be imagined as consisting of very small sections ($\chi_i$) over which velocities ($v_i$) can be regarded as constant (see FIG. 6). The apparent velocity for each section (i) between the injector port and the detector is characterized by:

$$v_{apparent} = \frac{x_i}{\frac{x_i}{v_i}}$$  Equation 2

Where:

$x_i$ = Length of a section of constant apparent velocity between the injector and detector port.

$\frac{x_i}{v_i}$ = Time required for the tracer to cross a section of constant velocity ($x_i$).

The apparent velocity at the detector can be estimated by averaging the velocities ($v_i$) of each section (i). In this respect, the apparent velocity value equals the sum of each section's distance ($\chi_i$), divided by the sum of times required for the groundwater flow to travel through each section.

In the limiting case, the sections are infinitely small and the sum can be replaced by integrals. Substituting the velocity function (equation 1), into the apparent velocity equation (equation 3) accounts for the velocity within the sections.

$$v_{apparent} = \frac{\sum x_i}{\sum \frac{x_i}{v_i}} = \frac{\int dx}{\int \frac{dx}{v(x)}} = \frac{r\int d\theta}{r\int \frac{d\theta}{v(\theta)}}$$  Equation 3

-continued $$= \frac{\int_\alpha^{\alpha+\gamma} d\theta}{\int_\alpha^{\alpha+\gamma} \frac{d\theta}{\sqrt{4v_\infty^2 \sin^2\theta}}}$$

When the tracer is introduced to the cylindrical surface 12 of the probe 10, it will be carried around the cylinder to the detector where one of the tracer's parameters, such as conductivity, can be measured. By measuring the time required for the tracer to travel the distance between the injector and detector, an apparent velocity ($v_{app}$) can be calculated. Two important parameters are involved in calculating the apparent velocity: the alpha angle ($\alpha$), which is the angle the approaching groundwater flow makes with the tracer injection point, and the gamma angle ($\gamma$), which is the angle between the injector and detector ports. The positions of the alpha a gamma angles are identified in FIG. 7.

Solving the equation, the approach velocity can be expressed as a function of the apparent velocity and the parameters alpha and gamma. Equation 4 is the resultant equation used to calculate the unknown approach velocity and therefore, estimates the groundwater velocity in the aquifer.

$$v_{approach} = \frac{(0.5)}{\gamma}(v_{apparent})\ln\left[\frac{\tan\left(\frac{\alpha+\gamma}{2}\right)}{\tan\left(\frac{\alpha}{2}\right)}\right] \quad \text{Equation 4}$$

To solve for equation 4 in field experiments, two separate experiments must be conducted at different $\alpha$-angles. Using the probe 10, the $\gamma$-angle parameter is fixed by construction, and $v_{app}$ can be measured using the detector 16. In field situations, the direction of groundwater flow will not always be known, which means the $\alpha$-angle parameter will likely be unknown. Changing the $\alpha$-angle while the approach velocity remains constant produces different apparent velocities. If the $\alpha$-angle of the first test is unknown, the $\alpha$-angle of the second experiment can be expressed as a function of the first test since the degree of probe rotation (i.e., change in the $\alpha$-angle) will be known. The first $\alpha$-angle can then be estimated mathematically using non-linear optimization, such calculation method being available on commercial software such as Microsoft Excel™.

A method by which the probe 10 can be used to estimate groundwater velocity in field experiments will now be provided. First the probe 10 is inserted into an aquifer, wherein the probe 10 is characterized by a known $\gamma$-angle which is the angle between the injector port 14 and the detector 16. In one embodiment, the $\gamma$-angle is about 50°. The $\alpha$-angle for this first experiment (hereinafter referred to as "$\alpha_1$") is unknown. A slug of tracer solution is then injected through injector port 14. Timer 33 in datalogger 28 is simultaneously actuated.

Detector 16 then detects the slug of tracer solution as such slug traverses detector 16, by measuring a characteristic parameter of the slug, such as conductivity. Detector 16 transmits an electrical signal to datalogger 28, such electrical signal being representative of conductivity measured by detector 16. Datalogger 28 measures the time required for the tracer slug to travel from the injector port 14 to the doctor 16. Some portions of the tracer slug travel faster than other portions. As such, it is useful to estimate the apparent velocity by averaging the time required for different portions of the tracer slug to travel the distance between the injector port 12 and the detector 16. To this end, three different approaches could be used to estimate the apparent velocity: the peak conductance approach, the centre mass approach, and the fitted curve approach.

In the peak conductance approach, peak electric conductance, as measured by the detector 16 during the experiment is identified. The time interval between injection of tracer solution slug through injector port 14 and measurement of peak electric conductivity is then identified. By relying on and knowing the distance between the injector port 14 and detector 16, an apparent velocity is then approximated.

In the centre of mass approach, a breakthrough curve is generated by plotting the sensor response (conductivity) against time, and the area under the curve is calculated. The arrival of the centre of mass at the sensor corresponds to the time at which half the area under the curve has accumulated in the breakthrough curve. Average velocity of groundwater around the cylinder, the apparent velocity, can be calculated by dividing the distance between the injector and the sensor by the time of arrival of the centre of mass.

In the fitted curve approach, a breakthrough curve is plotted, and then modeled with a mathematical equation describing advection and dispersion in a porous medium (an aquifer). Two parameters are adjusted until the model line passes through the data points, velocity and dispersion coefficient. For the purposes of this invention, the velocity is the parameter of interest. The estimated velocity corresponds to the apparent velocity used later in the probe equations to calculate the groundwater velocity in the aquifer.

After an apparent velocity ($v_1$) is estimated using the probe 10 at the first unknown $\alpha$-angle ($\alpha_1$), the probe is then rotated a pre-determined angle of rotation ($\Delta\alpha$) to a second $\alpha$-angle ($\alpha_2$). Angular indicators 15 (FIG. 3) assist in positing probe 10 at this second $\alpha$-angle. A second set of experiments at an $\alpha$-angle of $\alpha_2$ is conducted by injecting a slug of tracer solution through injector port 14 and measure electrical conductance as a function of time using detector 16. From this data, an apparent velocity is estimated in a similar manner as was done for the first experiment. This second apparent velocity ($v_2$) is, therefore, estimated using the probe 10 at a different characteristic $\alpha$-angle ($\alpha_2$) than in the first above-described experiment. This second $\alpha$-angle, $\alpha_2$, can expressed as being equal to $\alpha_1 \pm \Delta\alpha$.

Solving for $\alpha_1$ and $\alpha_2$ mathematically is accomplished by using Equation 4. Approach velocity ($v^\infty$) can be related to the apparent velocities ($v_1$ and $v_2$) of each of the above-describe two experiments as follows:

$$v^\infty = \frac{0.5}{\gamma}(v_1)\ln\left[\frac{\tan\left(\frac{\alpha_1+\gamma}{2}\right)}{\tan\left(\frac{\alpha_1}{2}\right)}\right] \quad \text{Equation 5}$$

$$v^\infty = \frac{0.5}{\gamma}(v_2)\ln\left[\frac{\tan\left(\frac{\alpha_1 \pm \Delta\alpha+\gamma}{2}\right)}{\tan\left(\frac{\alpha_1 \pm \Delta\alpha}{2}\right)}\right] \quad \text{Equation 6}$$

With respect to Equation 6, $\alpha_1 \pm \Delta\alpha$ is substituted for $\alpha_2$.

Since the approach velocities have the same values, Equation 5 and Equation 6 can be set equal to each other, leading to te relationship defined by Equation 7.

$$\frac{e^{\gamma_1}}{e^{\gamma_2}} = \frac{\left[\frac{\tan\left(\frac{\alpha_1+\gamma}{2}\right)}{\tan\left(\frac{\alpha_1}{2}\right)}\right]}{\left[\frac{\tan\left(\frac{\alpha_1+\gamma+\Delta\alpha}{2}\right)}{\tan\left(\frac{\alpha_1+\Delta\alpha}{2}\right)}\right]}$$ Equation 7

From this relationship, a non-linear optimizer could be used to solve for $\alpha_1$ (thereby providing direction of groundwater flow in the aquifer). Solving for $\alpha_1$ permits calculation of the approach velocity using either of Equation 5 or Equation 6.

Figure 9:
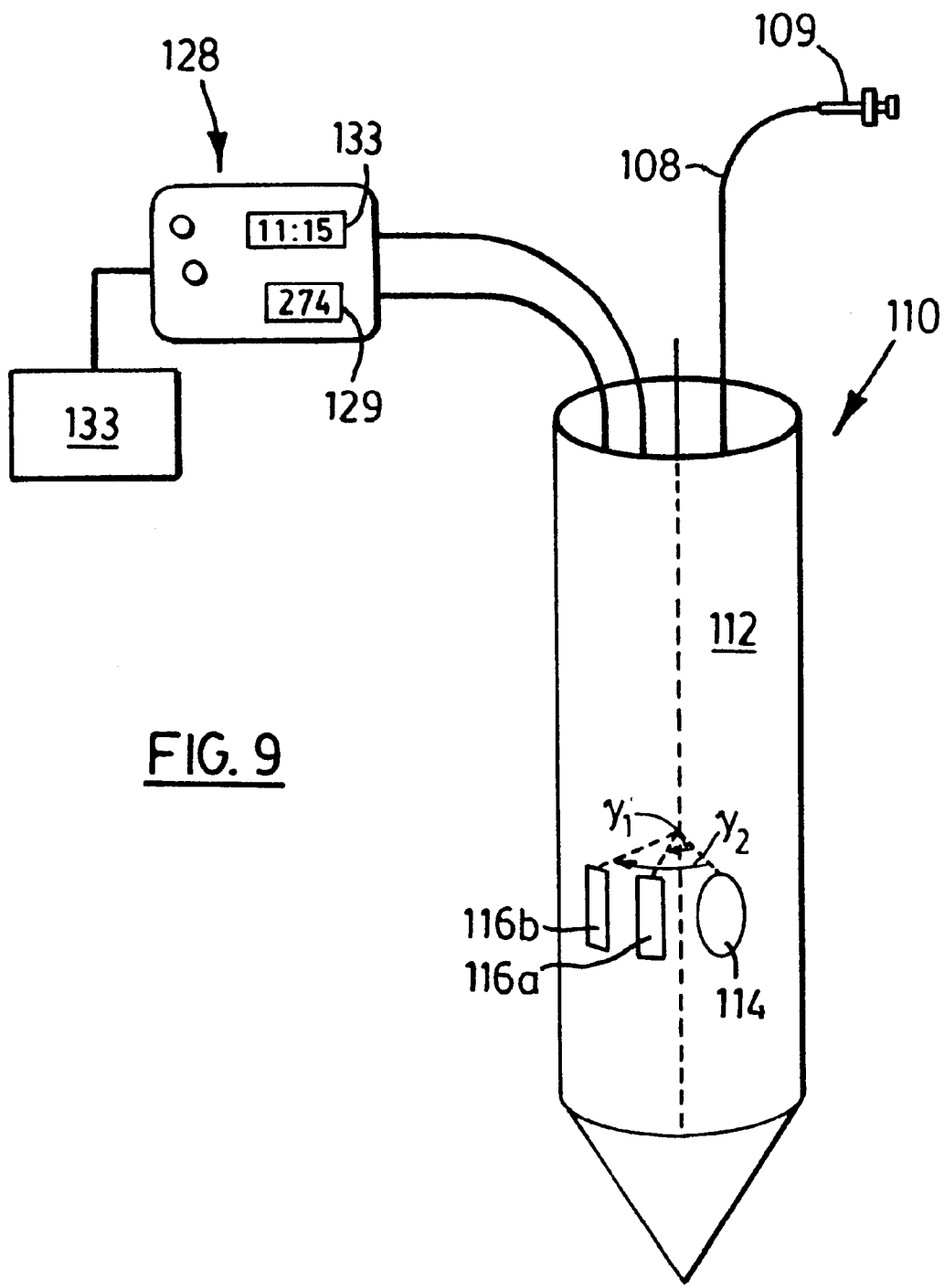
FIG. 9 is a schematic drawing of a perspective view of a further embodiment of the groundwater velocity probe.
Figure 10:
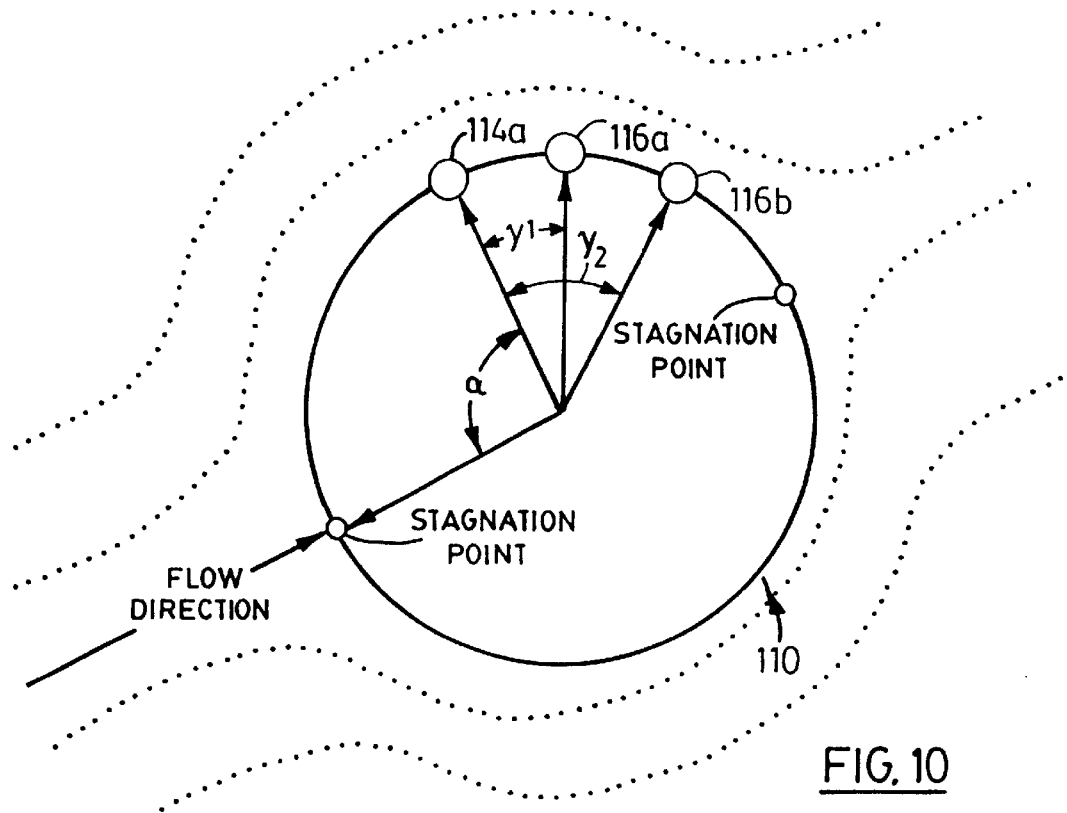
FIG. 10 is a schematic drawing of a plan view of the probe in a groundwater flow system, showing the angles α, $γ_1$. and $Y_2$

A further embodiment of the present invention is illustrated in FIGS. 9 and 10. FIG. 9 shows a probe 110 having an outwardly facing surface 112, is intimate contact with the environment of a surrounding aquifer. The surface 112 includes an injector par 114 and first and second detectors 116a and 116b, both detectors 116a and 116b being spaced from injector port 114. Notably, both detectors 116a and 116b are disposed on the same side relative to injector port 114 such that both detectors 116a and 116b are oriented on the same flowpath originating from injector port 114. Preferably, both detectors 116a and 116b are disposed along substantially the same plane as injector port 114.

Aside from the fact that probe 110 illustrated in FIG. 9 includes two detectors 116a and 116b disposed on the same side of injector port 114, probe 110 operates in the same manner probe 10. Both detectors 116a and 116b are electrically connected to a datalogger 128. The datalogger 128 includes a conductivity meter 129 which receives an electrical signal representative of conductivity measured by detectors 116a and 116b. The datalogger 128 logs and stores such information as a function of time. In this respect, the datalogger 128 includes an internal timer 133. The datalogger 128 can be manually activated when the tracer is injected, or it can be automatically triggered by tracer injection. The datalogger 128 is connected to a computer 131 for inputting information with respect to conductivity as a function of time.

Referring to the probe 110 illustrated in FIG. 9, when the tracer is injected at the cylindrical surface 112 of the probe 110 through injector port 114, it will be carried around the cylinder to both detectors 116a and 116b where one of the tracer's parameters, such as conductivity, can be measured. By measuring the time required for the tracer to travel the distance between the injector port 114 and the first detector 116a as well as between the injector port 114 and the second detector 116b, apparent velocities $v_{app1}$ and $v_{app2}$ can be calculated at each detector 116a and 116b respectively. As with the probe 10, two important parameters are involved in calculating apparent velocities using probe 110: the alpha angle ($\alpha$), which is the angle the approaching groundwater flow maker with the tracer injection point, and the gamma angle ($\gamma$), which is the angle between the injector port 114 and detector ports 116a and 116b. The positions of the alpha and gamma angles are identified in FIG. 10. Previously described Equation 4 can be used to calculate the unknown approach velocity, based on the measured apparent velocity, and therefore, estimate the groundwater velocity in the aquifer.

To estimate groundwater velocity in an aquifer using the probe 110, only one experiment must be conducted. This is in contrast to probe 10, where two separate experiments must be conducted in order to accurately estimate groundwater velocity in an aquifer. Using probe 110, each of the detectors 116a and 116b is is positioned at different $\gamma$-angles, namely $\gamma_1$ and $\gamma_2$ respectively. The probe 110 can be used to measure $v_{app1}$ and $v_{app2}$ of the tracer slug at locations proximate detectors 116a and 116b. The $\alpha$-angle can then be estimated mathematically using non-linear optimization.

A method by which probe 110 can be used to estimate groundwater velocity in a field experiment will now be provided. First, the probe 110 is inserted into an aquifer, wherein the probe 110 is characterized by two known $\gamma$-angles, namely $\gamma_1$ and $\gamma_2$, which are the angles between the injector port 114 and first detector 116a and between the injector port 114 and second detector 116b respectively. The $\alpha$-angle for the experiment is unknown. A slug of tracer solution is then injected through injector port 114 via tracer delivery line 108 using a syrange 109. Timer 133 and datalogger 128 are simultaneously actuated.

Each of detectors 116a and 116b then detect the slug of tracer solution as such slug traverses detectors 116a and 116b. Detectors 116a and 116b measure a characteristic parameter of the slug, such as conductivity. Detectors 116a and 11b transmit electrical signals to a conductivity meter 129 in datalogger 128, such electrical signals being representative of conductivity measured by each of detectors 116a and 116b. Using timer 133, datalogger 128 measures the time required for the tracer slug to travel from the injector port 114 to each of detectors 116a and 116b. Time elapsed information is inputted to computer 131 for calculating apparent velocities proximate detectors 116a and 116b, and the bulk velocity of the groundwater flow in the aquifer including its direction. The apparent velocities, $v_{app1}$ and $v_{app2}$ at each of the first detector 116a and the second detector 116b are then estimated using either of the peak conductance approach, centre of mass approach, or the fitted curve approach, such methods have been previously described above.

Solving for $\alpha_1$ mathematically is accomplished by using Equation 4. Approach velocity ($v^\infty$) can be related to the apparent velocities ($v_{app1}$ and $v_{app2}$) as follows:

$$v^\infty = \frac{0.5}{\gamma}(v_{app1})\ln\left[\frac{\tan\left(\frac{\alpha+\gamma_1}{2}\right)}{\tan\left(\frac{\alpha}{2}\right)}\right]$$ Equation 8

$$v^\infty = \frac{0.5}{\gamma}(v_{app2})\ln\left[\frac{\tan\left(\frac{\alpha+\gamma_2}{2}\right)}{\tan\left(\frac{\alpha}{2}\right)}\right]$$ Equation 9

Since the approach velocities have the same values, Equation 8 and 9 can be said equal to each other, leading to the relationship defined by Equation 10.

$$\frac{e^{\gamma_1}}{e^{\gamma_2}} = \frac{\left[\frac{\tan\left(\frac{\alpha+\gamma_1}{2}\right)}{\tan\left(\frac{\alpha}{2}\right)}\right]}{\left[\frac{\tan\left(\frac{\alpha+\gamma_2}{2}\right)}{\tan\left(\frac{\alpha}{2}\right)}\right]}$$ Equation 10

From this relationship, non-linear optimizer could be used to solve for $\alpha$ (thereby providing direction of groundwater flow in the aquifer). Solving for $\alpha$ permits calculation of the approach velocity using either of Equation 8 or Equation 9.

Figure 11:
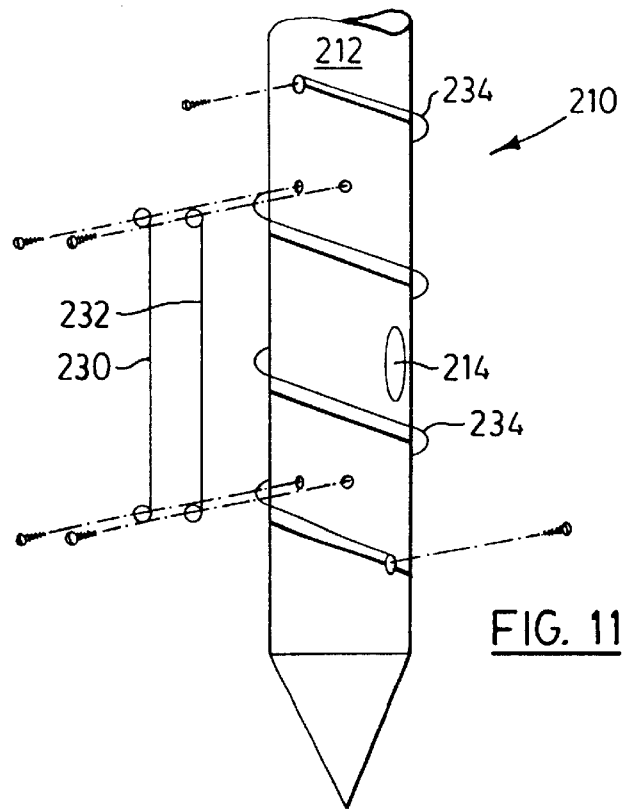
FIG. 11 is a schematic drawing of a further embodiment of the groundwater velocity probe.

A further embodiment of the present invention is illustrated in FIGS. 11 and 12. FIG. 12 shows a probe 210 having an outwardly facing surface 212, in intimate contact with the environment of a surrounding aquifer. The surface 212 includes a plurality of injector ports 214 separated vertically and disposed along different horizontal planes. Detectors 216a and 216b are also provided along each of these some horizontal planes and, therefore, associated with each of the injector ports 214. Each pair of detectors 216a and 216b are spaced from an associated injector port 214. Notably, each pair of detectors 216a and 216b are disposed on the same side relative to the associated injector port 214 such that each pair of detectors 216a and 216b are oriented on the same flowpath originating from the associated injector port 214. In this respect, probe 210 is similar to probe 110. In contrast to probe 110, however, probe 210 facilities simultaneous multiple measurements of groundwater velocity along various vertical depths in an aquifer.

Probe 210 operates in the same manner as probe 110. Each pair detectors 216a and 216b are electrically connected to a datalogger 228. The datalogger 228 includes a conductivity meter 229 which receives inputs of electrical signals of conductivity measured by detectors 216a and 216b. The datalogger 228 logs and stores such information as a function of time. In this respect, the datalogger 228 includes an internal timer 233 which is actuated with the initial injection of tracer through the injector ports 214. The datalogger 228 is connected to a computer 231 for inputting information with respect to conductivity as a function of time. Computer 231 calculates apparent velocity proximate each pair of detectors 216a and 216b, and the bulk velocity of the groundwater flow in the aquifer including its direction, in a similar manner as with probes 10 and 110.

Each pair of detectors 216a and 216b is slightly different than detectors 116a and 116b of probe 110 and detector 16 of probe 10. Referring to FIG. 11, detectors 216a and 216b comprise of vertical conductive wires 230 and 232 respectively. These wires 230 and 232 are connected to the datalogger 228. Probe 210 further includes an inset spiral wire 234 recessed into the 212. Spiral wire 234 is connected to datalogger 228. Detection of tracer occurs when contact is made by arrival of the conductive tracer between spiral wire 234 and one of the two vertical wires 230 and 232. The inset of the spiral wire 234 prevents short circuiting of the spiral wire 234 and the vertical wires 230 and 232.

Although the disclosure describes and illustrates preferred embodiments of the invention, it is to be understood that the invention is not limited to these particular embodiments. Many variations and modifications will now occur to those skilled in the art.

I claim:

1. A groundwater velocity probe comprising a surface with a first portion and a second portion,
    means for injecting a tracer proximate the first portion;
    first means for detecting the tracer, said first means for detecting disposed at said second portion, and
    means for measuring time elapsed between injecting the tracer and detecting the tracer.

2. The groundwater velocity probe as claimed in claim 1 wherein said surface is cylindrical.

3. The groundwater velocity probe as claimed in claim 2 wherein said cylindrical surface further comprises a third portion, and a second means for detecting the tracer is provided proximate the third portion, such that said means for injecting the tracer is disposed between said first means for detecting and said second means for detecting and such that said first means and said second means for detecting are oriented along different flowpaths originating from said means for injecting.

4. The groundwater velocity probe as claimed in claim 1 further comprising a pointed end for facilitating hammering of the probe into an aquifer.

5. The groundwater velocity probe as claimed in claim 1 wherein said first means for detecting the tracer includes a conductivity sensor.

6. The groundwater velocity probe as claimed in claim 1 wherein said tracer is injected along a first plane and said first means for detecting the tracer is disposed along substantially the same plane.

7. The groundwater velocity probe as claimed in claim 6 further comprising fist and second warning detectors disposed above and below said first means for detecting the tracer, the first and second warning detectors provided for sensing non-linear travel of the tracer.

8. The groundwater velocity probe as claimed in claim 7 wherein said first means for detect the tracer includes a conductivity sensor.

9. The groundwater velocity probe as claimed in claim 2 further comprising angular indicators for enabling rotation of the probe about its axis by a known angular displacement.

10. The groundwater velocity probe as claimed in claim 2 wherein said cylindrical surface comprises a third portion, and a second means for detecting the tracer is provided proximate the third portion, such that said first and said second means for detecting the tracer are oriented along a common flowpath originating from said means for injecting.

11. The groundwater velocity probe as claimed in claim 10 wherein each of said first and second means for detecting comprises a conductivity sensor.

12. The groundwater velocity probe as claimed in claim 1 further comprising a computing means for estimating groundwater velocity proximate said second portion.

13. A method of measuring groundwater velocity in an aquifer comprising the steps of:
    providing a groundwater velocity probe in an aquifer, the groundwater velocity probe having a surface with a first portion and a second portion, means for injecting a tracer having a characteristic property proximate the first portion, means for detecting the characteristic property of the tracer proximate the second portion, and means for measuring time elapsed between injecting the tracer and detecting the characteristic property of the tracer;
    injecting the tracer proximate the first portion;
    starting a timer in a datalogger;
    detecting the characteristic property of the tracer proximate the second portion;
    inputting an electrical signal representative of the characteristic property to the datalogger, and
    measuring time elapsed between injecting the tracer and detecting the characteristic property with the datalogger.

14. The method as claimed in claim 13 further comprising the step of inputting the time elapsed inflation into a computer for estimating velocity of the tracer proximate the second portion.

15. The groundwater velocity probe as claimed in claim 1, further comprising a warning means for detecting the tracer, the warning means for detecting the tracer being disposed at a different plane than the first means for detecting the tracer.

16. The groundwater velocity probe as claimed in claim 15, wherein the warning means is disposed at a different vertical plane than the first means for detecting the tracer.

17. The groundwater velocity probe as claimed in claim 1, further comprising an angular indicator configured to facilitate rotation of the probe by a known angular displacement.

18. The groundwater velocity probe as claimed in claim 2, wherein the first means for detecting the tracer and the second means for detecting the tracer are disposed on a common plane.

19. The groundwater velocity probe as claimed in claim 18, wherein the first means and the second means are disposed on substantially the same vertical plane.

20. The groundwater velocity probe as claimed in claim 3, wherein the first means for detecting the tracer and are second means for detecting the tracer are oriented along directionally opposite flow paths.

21. The groundwater velocity probe as claimed in claim 10, wherein the first means and the second means for detecting the tracer are disposed on a substantially common plane.

22. The groundwater velocity probe as claimed in claim 21, wherein the first means and second means are disposed on substantially the same vertical plane.

* * * * *